United States Patent

Banhardt et al.

Patent Number: 5,892,128
Date of Patent: Apr. 6, 1999

[54] TEMPORARILY INACTIVATED BENZOYL PEROXIDE, PROCESSES FOR THE PRODUCTION THEREOF, AND THE USE THEREOF

[75] Inventors: Volker Banhardt, Ballrechten-Dottingen; Roland Opferkuch, Bad Drozingen-Tunsel, both of Germany

[73] Assignee: Koch Marmorit GmbH, Bollschweil, Germany

[21] Appl. No.: 657,372

[22] Filed: Jun. 3, 1996

[30] Foreign Application Priority Data

Jun. 2, 1995 [DE] Germany .................. 195 20 369.0

[51] Int. Cl.$^6$ .................................................. C07C 409/34
[52] U.S. Cl. .............................................................. 568/559
[58] Field of Search .............................................. 568/559

[56] References Cited

U.S. PATENT DOCUMENTS

| | | |
|---|---|---|
| Re. 28,818 | 5/1976 | Eymans . |
| 4,255,277 | 3/1981 | Smearing . |
| 4,376,218 | 3/1983 | Izzard ................................... 568/559 |
| 5,276,202 | 1/1994 | Ceh ...................................... 568/559 |

FOREIGN PATENT DOCUMENTS

| | | |
|---|---|---|
| 522868 | 10/1953 | Belgium . |
| 0038988 | 4/1981 | European Pat. Off. . |
| A 114115 | 6/1974 | Germany . |
| 3900 752 | 7/1990 | Germany . |

OTHER PUBLICATIONS

CA:125:275416 : Abs of WO9627586 "Preparation of solid diacyl peroxide dispersions" Sep. 12, 1996.

*Primary Examiner*—Porfirio Nazario-Gonzalez
*Assistant Examiner*—Jean F. Vollano
*Attorney, Agent, or Firm*—Jacobson, Price, Holman & Stern, PLLC

[57] ABSTRACT

Benzoyl peroxide is inactivated temporarily by compressing benzoyl peroxide desensitized by dimethyl phthalate to tablets.

4 Claims, No Drawings

TEMPORARILY INACTIVATED BENZOYL PEROXIDE, PROCESSES FOR THE PRODUCTION THEREOF, AND THE USE THEREOF

Benzoyl peroxide, sometimes also designated as dibenzoyl peroxide, is a substance which is often used as initiator for free radical chain reactions. Benzoyl peroxide available on the market contains at least 20% of water or 50% of other desensitizers in the form of paste or powder. The desensitizer used most frequently is dimethyl phthalate. In addition, however, oil, paraffin, wax, Centralit®, and other stabilizers can be used. It is assumed that desensitizers function as heat transfer isolators and therefore prevent thermal conduction from one crystal to another.

Benzoyl peroxide is used, e.g., as initiator for the polymerization and/or crosslinking of styrene, Buna S, methacrylates, allyl esters, and other unsaturated polyesters and polyolefins. In general, the polymerization initiated by radicals takes place immediately as soon as the polymerizable substances contact the benzoyl peroxide. Sometimes, however, for technical reasons the polymerization is demanded to take place only at a later time. In such cases the polymerizable mixture and the initiator are to be kept separately from each other. This is done, e.g., by fusing the initiator in glass vials which are broken at the desired time such that the initiator can intermix with the polymerizable components. A drawback of this method is that the fully polymerized mixture is contaminated by broken glass. Therefore, there is a need for inactivating benzoyl peroxide temporarily without having to admix other substances, materials or contaminants to the mixture.

Now, this object could be solved surprisingly simple by compressing benzoyl peroxide desensitized by dimethyl phthalate to tablets. Surprisingly, such tablets of benzoyl peroxide desensitized by dimethyl phthalate can be added to the polymerizable mixtures without polymerization or crosslinking taking place. This effect cannot be attributed exclusively to a surface reduction of the benzoyl peroxide. For example, dimethyl peroxide desensitized by calcium sulfate dihydrate cannot be inactivated temporarily by this method. A subsequent explanation of the surprising finding might be that during tabletizing the benzoyl peroxide crystals are covered at least at the surface of the tablet by a continuous thin dimethyl phthalate film such that the benzoyl peroxide is not only desensitized but even inactivated completely. To initiate polymerization or crosslinking, in accordance with the invention it only will be necessary to destroy the tablet. The destruction can be effected, e.g., by crushing, grinding, stamping or treating by means of a strong agitator. Therefore, the benzoyl peroxide quantities being present within the tablet will remain desensitized but nevertheless completely active for initiating free radical chain reactions.

Therefore, the temporarily inactivated benzoyl peroxide according to the invention can be used excellently for polymerization or crosslinking reactions not desired before a particular time. An example for this are vials which are filled with the polymerizable mixture, fillers, and one or several tablets prepared according to the invention and can be inserted into bore holes. As soon as the wall anchor, hook, or other fastening element to be inserted into the bore hole is screwed in or driven In, the vial and the tablet as well will break so that polymerization will be initiated.

Other application fields are liquid or viscous pasty mixtures of polymerizable substances, optionally fillers, and the tablets according to the invention which are to be used to seal holes or joints. Also in this case, only breaking of the tablets according to the invention within the polymerizable substances and distributing them more or less evenly has to be provided. Then, polymerization will start more or less rapidly so that curing of the mixture will take place.

The tableting process can be carried out within common tablet presses. Presses for flat tablets or also concave tablets are suitable. In principle, also other tablet shapes are possible, such as tablets having a dividing groove. For spatial reasons, these elongated tablets may optionally be advantageous as compared to common spherical tablets.

A particular advantage of the tablets according to the invention is that no additional auxiliary agents are necessary. In principle, however, it is entirely possible to admix inert additives to the tablets which do not affect the stability of the tablets but impart additionally desired properties to the fully polymerized mixture. Thus, also dyes or color pigments can be admixed to these tablets dyeing or pigmenting the fully polymerized mixture. At the same time, an even coloration of the mixture indicates the benzoyl peroxide has been distributed evenly within the polymerizable mixture.

Therefore, in the first place the object of the present invention is the temporarily inactivated benzoyl peroxide consisting of benzoyl peroxide compressed to tablets being desensitized by dimethyl phthalate. A further object of the invention is the process for the temporary inactivation of benzoyl peroxide, characterized in that a benzoyl peroxide desensitized by dimethyl phthalate is compressed to tablets. Finally, an object of the present invention is the use of temporarily inactivated benzoyl peroxide in the form of tablets of benzoyl peroxide being desensitized by dimethyl phthalate for the production of free-radical polymerizable and/or crosslinkable mixtures.

EXAMPLE

Powder of benzoyl peroxide being desensitized by approximately 50% by weight of dimethyl phthalate (available from Atochem, Akzo and Peroxidechemie GmbH) was fed into a tablet pressing apparatus with a pressure of about 5 t. Tablets with 7 mm diameter and 2 mm height were produced. These tablets could be brought in direct contact with typical mixtures of free-radical polymerizable and/or crosslinkable monomers. No polymerization or crosslinking reaction happened. After destroying the tablet in the mixture the reaction started in a similar way as the same mixtures being brought in contact with the benzoyl peroxide powder used as starting material for the tablets.

We claim:

1. A polymerization initiator comprising benzoyl peroxide crystals, in combination with dimethyl phthalate, in inactivated tablet form, wherein a continuous film of the dimethyl phthalate covers the benzoyl peroxide crystals at the tablet surface.

2. The initiator of claim 1, wherein the dimethyl phthalate is present in an amount sufficient to desensitize the benzoyl peroxide.

3. A polymerizable composition comprising the initiator of claim 1 in combination with free-radical polymerizable and/or crosslinkable mixtures.

4. A polymerizable composition comprising the initiator of claim 2 in combination with free-radical polymerizable and/or crosslinkable mixtures.

* * * * *